United States Patent
Martone et al.

(10) Patent No.: US 9,635,508 B2
(45) Date of Patent: Apr. 25, 2017

(54) FAST METHOD FOR WIDEBAND SPECTRUM SENSING

(71) Applicant: U.S Army Research Laboratory, Adelphi, MD (US)

(72) Inventors: Anthony F. Martone, Ellicott City, MD (US); Kenneth I. Ranney, Rockville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 183 days.

(21) Appl. No.: 14/453,761

(22) Filed: Aug. 7, 2014

(65) Prior Publication Data

US 2015/0201420 A1    Jul. 16, 2015

Related U.S. Application Data

(60) Provisional application No. 61/927,187, filed on Jan. 14, 2014.

(51) Int. Cl.
  *H04W 72/08* (2009.01)
  *H04W 4/02* (2009.01)
  *H04L 27/00* (2006.01)

(52) U.S. Cl.
  CPC ......... *H04W 4/025* (2013.01); *H04L 27/0006* (2013.01)

(58) Field of Classification Search
  CPC .................................................. H04W 72/082
  (Continued)

(56) References Cited

U.S. PATENT DOCUMENTS 6,072,994 A * 6/2000 Phillips ................. G01S 13/767
                                                     375/219
7,596,127 B1 * 9/2009 May ..................... H04L 5/0007
                                                     370/329

(Continued)

OTHER PUBLICATIONS

U.S. Appl. No. 14/010,580, filed Aug. 27, 2013, titled "Method and Apparatus for Cognitive Nonlinear Radar".

(Continued)

*Primary Examiner* — Parth Patel
(74) *Attorney, Agent, or Firm* — Eric Btett Compton

(57) ABSTRACT

Embodiments of the present invention relate cognitive radar and RF technologies, and more particular, to spectrum sensing processing for rapidly monitoring the RF spectrum for channel availability and activity. The goal is to find and use unoccupied RF channels to broadcast and receive information. According to one embodiment, a method for analyzing a received RF signal to determine unused channels, or frequencies, therein, comprises: analyzing a received RF signal to determine anchor points that represent high energy frequency locations; calculating distances between the determined anchor points; identifying and eliminating clusters or isolated anchor points defined as a high energy region of interference based on the calculated distances; and selecting at least one remaining unoccupied frequency for transmitting or receiving a RF signal. The method may further include performing an optional quality or risk assessment on remaining frequencies of the waveform, and eliminating high risk frequencies from consideration in some instances.

20 Claims, 8 Drawing Sheets

(58) Field of Classification Search
USPC .......................................................... 370/252
See application file for complete search history.

(56) References Cited

U.S. PATENT DOCUMENTS

| | | | |
|---|---|---|---|
| 7,933,566 B2* | 4/2011 | Li ........................ | H04B 1/7097 455/115.1 |
| 8,134,913 B1* | 3/2012 | Gerakoulis ............. | H04L 5/026 370/208 |
| 8,873,385 B2* | 10/2014 | Wu ....................... | H04L 69/163 370/230 |
| 2002/0167970 A1* | 11/2002 | Starr ....................... | H04J 1/02 370/480 |
| 2003/0223518 A1* | 12/2003 | Shmulyian ........... | H04B 1/1036 375/346 |
| 2004/0062317 A1* | 4/2004 | Uesugi ................. | H04B 1/7097 375/260 |
| 2004/0091057 A1* | 5/2004 | Yoshida ............ | H04L 25/03146 375/260 |
| 2006/0126546 A1* | 6/2006 | Lee ...................... | H04B 7/2615 370/310 |
| 2007/0133698 A1* | 6/2007 | Jung ................... | H04L 27/2628 375/260 |
| 2008/0218153 A1* | 9/2008 | Patel .................. | G01R 19/2513 324/76.21 |
| 2010/0041339 A1* | 2/2010 | Miller, II .............. | H04W 24/00 455/62 |
| 2010/0075704 A1* | 3/2010 | McHenry .............. | H04W 16/14 455/509 |
| 2010/0189132 A1* | 7/2010 | Fettweis ................. | H04L 5/003 370/480 |
| 2010/0266002 A1* | 10/2010 | Du ....................... | H04B 17/345 375/224 |
| 2010/0266004 A1* | 10/2010 | Aoki ........................ | H04B 3/46 375/226 |
| 2011/0034200 A1* | 2/2011 | Leabman ............... | H01Q 1/246 455/517 |
| 2011/0228832 A1* | 9/2011 | De Francisco Martin .................. | H04W 72/02 375/224 |
| 2011/0235760 A1* | 9/2011 | Yu ....................... | H04B 1/0475 375/346 |
| 2012/0008514 A1* | 1/2012 | Ponnuswamy ....... | H04W 24/06 370/252 |
| 2012/0294347 A1* | 11/2012 | Husted ............... | H04B 17/0085 375/224 |
| 2013/0017792 A1* | 1/2013 | Miller, II .............. | H04W 16/14 455/62 |
| 2013/0089126 A1* | 4/2013 | Walker ................... | H04L 1/201 375/224 |
| 2014/0092941 A1* | 4/2014 | Agarwal ............. | H04B 1/7136 375/133 |
| 2014/0177679 A1* | 6/2014 | Whitaker ............ | H04L 27/0004 375/139 |
| 2014/0293747 A1* | 10/2014 | Calvarese ........... | G01S 7/52004 367/95 |
| 2014/0307565 A1* | 10/2014 | Samarasooriya ........ | H04B 1/18 370/252 |
| 2015/0381221 A1* | 12/2015 | Cyzs .................... | H04B 1/7097 375/346 |

OTHER PUBLICATIONS

Anthony F. Martone and Kenneth Ranney, "Fast Technique for Wideband Spectrum Sensing," paper presented at the 2014 IEEE International Symposium on Antennas and Propagation and USNC-URSI Radio Science Meeting in Memphis, TN, Jul. 6-11, 2014.

Anthony Martone et al. "Spectrum Sensing Techniques for Nonlinear Radar" paper and slide presentation presented at the SPIE 2014 Conference in Baltimore, MD, May 5-9, 2014.

A. Martone, K. Ranney, A. Hedden, G. Mazzaro, D. McNamara, "Cognitive processing for nonlinear radar", in Proceedings ofSPIE Radar Sensor Technology XVII, vol. 8714, Baltimore, MD, May 2013.

P. Bhatt, V. Chakka, "Non-uniform Spectrum Sensing Using Computationally Efficient 2-level (FFT-Goertzel) Based Energy Detection," in 2012 Third International Conference on Computer and Communication Technology (ICCCT), Nov. 2012, pp. 221-226.

Y. Feng, X. Wang, "Adaptive Multiband Spectrum Sensing," IEEE Wireless Communications Letters, vol. I, No. 2, pp. 121-124, Apr. 2012.

Y. Tsung-Han, 0. Sekkat, S. Rodriguez-Parera, D. Markovic, D. Cabric, "A Wideband Spectrum-Sensing Processor With Adaptive Detection Threshold and Sensing Time," IEEE Transactions on Circuits and Systems I: Regular Papers, vol. 58, No. 11 , pp. 2765-2775, Nov. 2011.

T. Feng, G. Wang, S. Culver, M. Gidlund, "Collaborative Spectrum Sensing in Cognitive Radio System—Performance Analysis of Weighted Gain Combining," in 2011 Ninth Annual Communication Networks and Services Research Conference (CNSR), May 2011, pp. 1-6.

S. Haykin, D. Thomson, J. Reed, "Spectrum Sensing for Cognitive Radio," Proceedings of the IEEE, vol. 97, No. 5, pp. 849-877, May 2009.

Z. Quan, C. C Shuguang, A. Sayed, H. Poor, "Optimal Multiband Joint Detection for Spectrum Sensing in Cognitive Radio Networks," IEEE Transactions on Signal Processing, vol. 57, No. 3, pp. 1128-1140, Mar. 2009.

F. Digham, M. Alouini, M. Simon, K. Marvin, "On the Energy Detection of Unknown Signals Over Fading Channels," IEEE Transactions on Communications, vol. 55, No. 1, pp. 21-24, Jan. 2007.

J. Mitola, G. Maguire, "Cognitive radio: making software radios more personal," IEEE Personal Communications, vol. 6, No. 4, pp. 13-18, Aug. 1999.

H. Urkowitz, "Energy detection of unknown deterministic signals," Proceedings of the IEEE, vol. 55, No. 4, pp. 523-531, Apr. 1967.

* cited by examiner

Risk Assessment Method 1: Define guard bands to sufficiently exclude sidelobe power from any adjacent eliminated zones

Risk Assessment Method 3: Evaluate Power Levels at edges of cluster or isolated anchor

Risk Assessment Method 3: Evaluate Average Power Levels

Average= $\Sigma (P_1 + P_2 + P_3 + \ldots + P_N) / N$

Risk Assessment Method 4: Determine bandwidth for center frequency

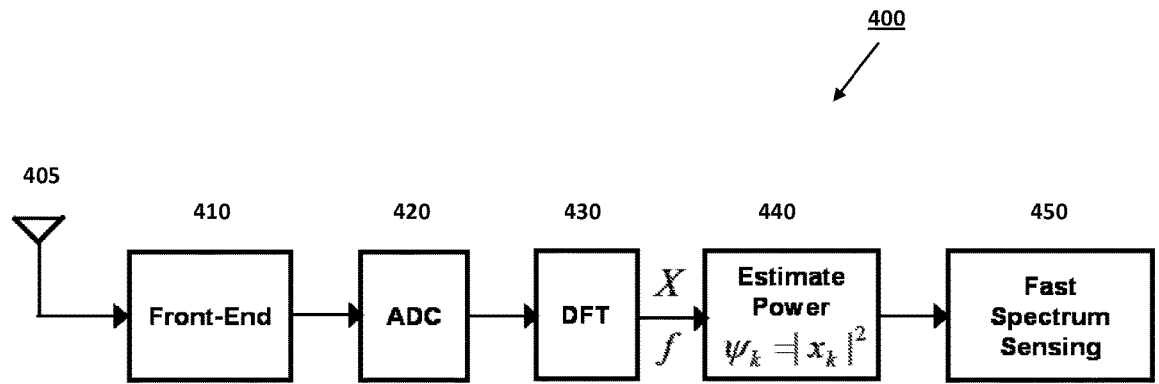
Figure 4
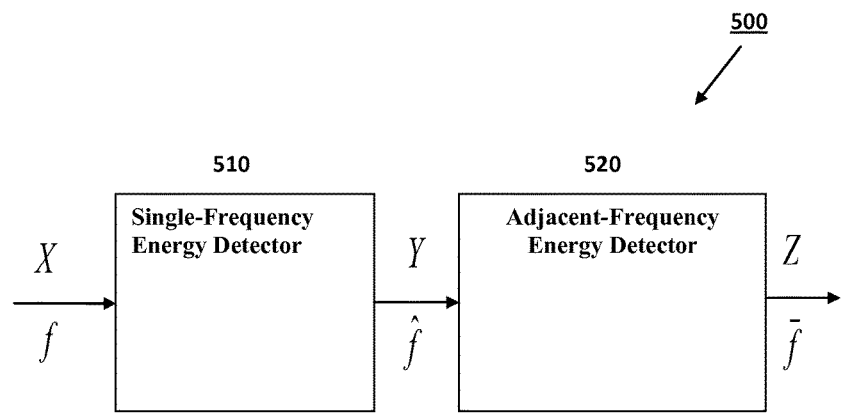
Figure 5 (*Conventional*)

FAST METHOD FOR WIDEBAND SPECTRUM SENSING

CROSS REFERENCE TO RELATED APPLICATION(S)

This application claims the benefit of U.S. Provisional Patent Application No. 61/927,187 filed Jan. 14, 2014, herein incorporated by reference in its entirety for all purposes.

GOVERNMENT INTEREST

Governmental Interest—The invention described herein may be manufactured, used and licensed by or for the U.S. Government.

BACKGROUND OF THE INVENTION i) Field of Invention

This application generally relates cognitive radar and radio (RF) technologies, and more particularly, to spectrum sensing processing for rapidly monitoring the RF spectrum for channel availability and activity.

ii) Description of Related Art

It is desirable that RF systems operate without interfering with one other. Cognitive radar/radio systems can be configured dynamically so as to use the best channels in its vicinity to minimize interference. Spectrum sensing is a technique employed by cognitive radio and radar to monitor the RF spectrum for channel availability and the activity of the primary user, i.e. the licensed user. It is a highly valued asset to increase spectrum utilization for cognitive radar and radio. Spectrum utilization is a key issue for radars and radios due to "cluttered" electromagnetic environments (EME), i.e., a growing problem for ground-based and airborne radar systems that need to operate simultaneously without interfering with other radar, communication and electronic warfare systems.

Several known multiband energy detection techniques exist for spectrum sensing include: 1) strategies to reduce computational complexity and minimize spectral leakage; and 2) multiband joint detection techniques that simultaneously detect signal energy over multiple non-overlapping channels. These techniques, however, only consider the energy at a single frequency and do not consider the surrounding energy near a frequency.

This problem is becoming more critical as the frequency spectrum available for radars and radios shrinks due to growing wireless communication device usage and spectrum management regulations And this problem is further exacerbated for radar by the growing number of targets of interest (TOI), whose radar response can vary greatly with frequency; radars thus must adapt to these TOIs while utilizing unoccupied frequency bands.

BRIEF SUMMARY OF THE INVENTION

Embodiments of the present invention relate cognitive radar and RF technologies, and more particularly, to spectrum sensing processing for rapidly monitoring the RF spectrum for channel availability and activity. The goal of the processing is to find and use unoccupied RF channels to broadcast and receive information. This technology addresses current RF and radar system challenges posed by increasingly cluttered EME.

According to one embodiment, a method for analyzing a received RF signal to determine unused channels, or frequencies, therein, comprises: analyzing a received RF signal to determine anchor points that represent high energy frequency locations; calculating distances between the determined anchor points; identifying and eliminating clusters or isolated anchor points defined as a high energy region of interference based on the calculated distances; and selecting at least one remaining unoccupied frequency for transmitting or receiving a RF signal.

The method may be executed such that (i) any unused determined frequency is substantially devoid of noise; and/or (ii) the surrounding energy of the unused determined frequency is minimal. Prior to determining anchor points, (i) time-domain data of the received RF signal is converted to the frequency domain via the fast Fourier transform (FFT); and (ii) energy estimates are determined for the frequency domain samples. Anchor points may be determined using a binary hypothesis test in some embodiments.

The method may further include performing a quality or risk assessment on remaining frequencies. Risk can be assessed by: defining a guard band to provide a buffer for anticipated sidelode interference from the edge of an adjacent eliminated cluster or isolated anchor points sufficient, and determining if power levels in the guard band are above or below a threshold; determining if power levels at or near the edge of an adjacent eliminated cluster or isolated anchor point is above or below a threshold; determining if the average power level for unoccupied frequencies is above or below a threshold; determining if the bandwidth between adjacent eliminated clusters or isolated anchor points is above or below a threshold; or any combination thereof. Those remaining frequencies with a high risk assessment may be eliminated from consideration. And any remaining frequency having a minimal risk assessment may be preferably selected. The overall computational complexity of the entire method may preferably be of order $O(N)$.

According to another embodiment, a system for analyzing a received RF signal to determine unused channels, or frequencies, therein, has at least one processor and one or more modules executable by the at least one processor, and comprises: a fast spectrum sensing module configured to execute the method for processing a received RF signal to determine unused channels, or frequencies. Additionally, the system may further comprise: a front-end module configured to process a received RF signal; an analog digital converter (ADC) configured to digitize the processed signal; a discrete Fourier transform (DFT) module configured to transform the digitized signal into a set of frequency domain samples; and an estimate power module configured to estimate the power of the signal at various frequencies.

According to yet another embodiment, a computer-readable storage medium having computer-readable instructions, that when executed by a processor, implement the method for analyzing a received RF signal to determine unused channels, or frequencies.

These and other embodiments are further discussed below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only a few embodiments of this invention and are therefore not to be considered limiting of its scope, for the invention may admit to other equally effective embodiments. These embodiments are intended to be included within the following description and protected by the accompanying claims.

FIG. 4 is a block diagram of fast spectrum sensing system according to an embodiment.

FIG. 5 shows a block diagram of a conventional method to detect unused frequencies for comparison sake.

DETAILED DESCRIPTION OF THE INVENTION

A unique and innovative fast spectrum sensing methodology is disclosed for radar and radio applications. The methodology includes analyzing RF signals and selecting unused channels, or frequencies, within a wide-frequency band of interest. This method quickly determines and eliminates high-power regions from further consideration. Processing requires use of anchor points to identify high power regions for elimination. Then an optional risk assessment may be performed on noisy nearby frequencies for further elimination since high power interference could leak into a potential unused frequency over time. The remaining "unused" frequencies can serve as potential transmission and/or reception frequencies for RF signals.

Two criteria may be used to select an unused frequency according to the method: 1) the unused frequency should be substantially devoid of noise; and 2) the surrounding power of the unused frequency should be minimal. These criteria are general for both radar and radio applications for suitable operation of the radar/radio. Actual values for these criteria would be linked to a particular system and method of operation, and are not limiting. The innovative fast spectrum sensing methodology described herein is based on an energy detection paradigm. The first criterion is important since reception by the cognitive radar or radio at frequencies occupied by a primary user or noise/interference decreases the signal to noise ratio (SNR); receptions at these frequencies must be avoided. The second criterion is important since high power interference from neighboring frequencies may leak into a potential unused frequency over time.

To select unused frequencies within a wide frequency band, the method analyzes one or more RF signals to identify and eliminate regions, or clusters, of high power. The RF signals are received by at least one antenna, which may be any general RF antenna. The computational complexity of this method is significantly less than that of conventional methods thereby improving the efficiency and effectiveness of spectrum sensing processing.

Figure 1:
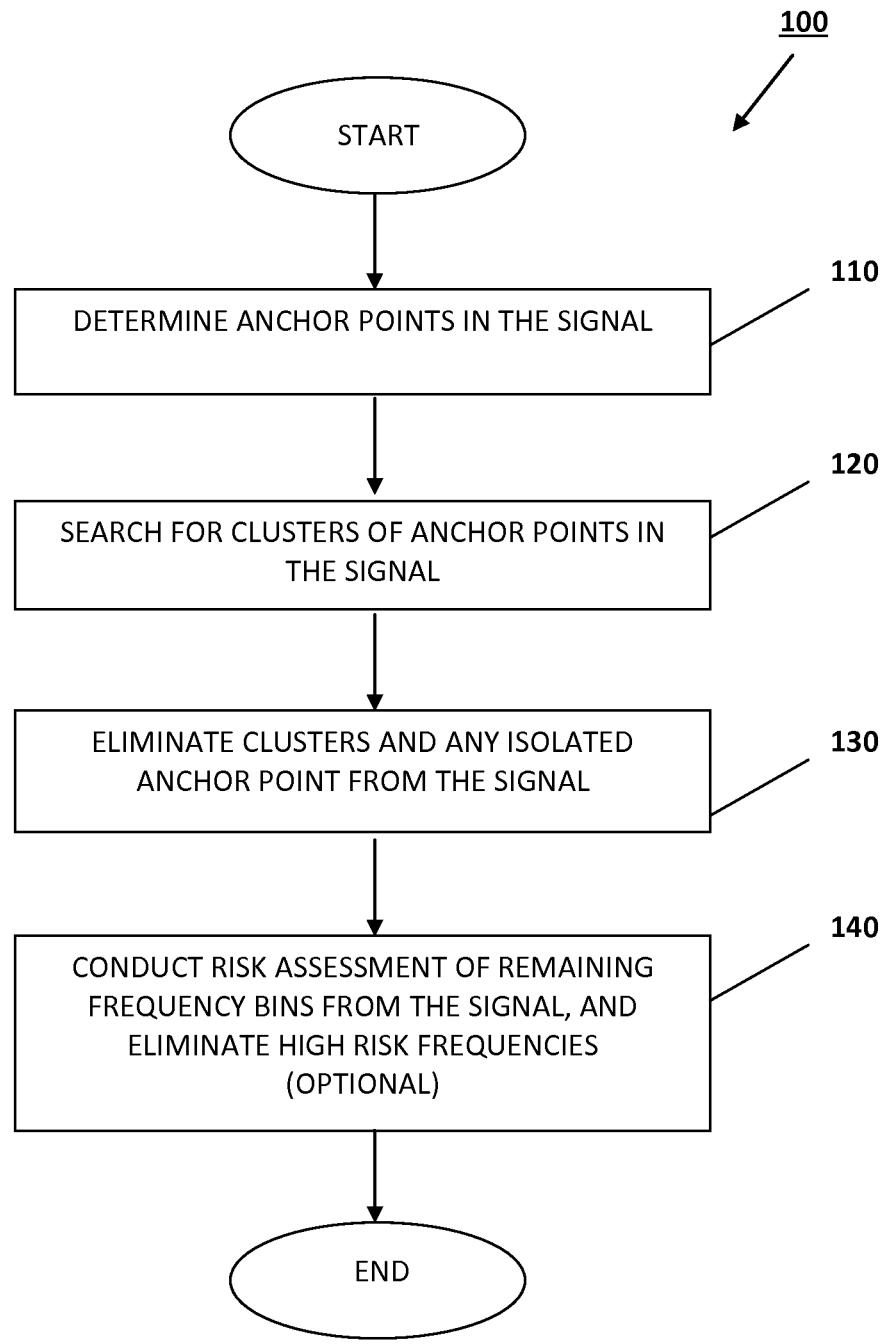
FIG. 1 shows a fast spectrum sensing method according to an embodiment.

FIG. 1 is a block diagram of the fast spectrum sensing method 100 according to an embodiment. The method includes the following steps: 110—conduct binary hypothesis test to determine anchor points, 120—search for clusters of anchor points anchor points, 130—search and eliminate clusters, and 140—conduct an optional quality or risk assessment to eliminate high risk frequencies nearby. These steps may be executed by one or more processors provided in a module, e.g., module 450 of the system 400 illustrated in FIG. 4, and further discussed below.

One or more RF signals are received by one or more antennas (e.g., antenna 405 illustrated in FIG. 4). Typically, RF signals originate from multiple sources at different locations and over many frequencies. The system 400 may use multiple antennas 405 to receive multiple ambient signals the different sources and then combine the received signals in some way into an input RF signal, such as with a multiplexer or similar device. The input RF signal is an electronic signal or waveform. The antennas 405 might be directional, omni-directional or some combination thereof. It may be possible to limit the input RF signal to a smaller range or band of frequencies of interest with filtering, for instance.

The generalized approach of method 100 analyzes the input RF signal by estimating the power spectrum. While the input RF signal is in the time-domain, it preferably is converted to the frequency domain for processing and analyses. The method 100 analyzes the input RF signal by looking at all the energy/power in frequency domain to identify areas which likely will represent interference that should be avoided, and find unoccupied regions which do not. The frequency range of interest is chosen based on the intended operational frequency bands where the radio/radar is to operate. It is expected that interference exists within the intended operational range. Of course, any exemplary operational frequencies mentioned herein are not limiting and others certainly may be received and processed according to the scope of the invention.

Prior to implementing the method 100, the input RF signal may be pre-processed such that: 1) the sampled time-domain data is converted to the frequency domain via the fast Fourier transform (FFT); and 2) power estimates are determined for the frequency domain samples. Pre-processing of the received RF signal can be implemented by a fast spectrum sensing system as further discussed below. This produces a vector of the power samples $X=\{x_1, \ldots x_N\}$ corresponding to frequencies $f=\{f_1, \ldots f_N\}$. N is the number of frequencies of interest.

The power samples are first processed in step 110 by conducting a binary hypothesis test to determine anchor points. The anchor points represent high power frequency locations in the RF signal. These may be quantified as amounts above a preset threshold value, although the preset threshold value, will likely vary each application or implementation. And because of their high power, anchor points and their surrounding frequencies are likely to cause interference and thus are candidates for elimination. One way anchor points may be determined is by implementing the following binary hypothesis test:

$$x_j \underset{H_0}{\overset{H_1}{\gtrless}} \gamma \qquad (1)$$

where $x_j$ is the $j^{th}$ power sample, $\gamma$ is the threshold variable, $H_0$ is the null hypothesis for $x_j=n_j$ (i.e. noise only), $H_1$ is the alternative hypothesis for $x_j=s_j+n_j$ (i.e. signal plus noise), $s_j$ is the deterministic signal to be detected, and $n_j$ is additive white noise. The computational complexity for the test in (1) is O(N). Other tests might also be used in step 110 for determining anchor points.

The binary hypothesis test is a well-known detection technique used in statistical analysis for hypothesis testing. It is simply a threshold test. It is also widely-known in the cognitive radio community for detecting frequencies whose energy is over a predetermined threshold. The "noise," may be white Gaussian noise approximated by a simple model used to formalize the binary hypothesis test (a very commonly used model). This noise is due to ambient radiation and receiver electronics. The null hypothesis is energy below the threshold; the alternative hypothesis is energy above the threshold.

In step 120, a search for clusters of anchor points in the input RF signal is performed. Clusters are identified based on the distance between the anchor points. For example, the distance between the anchor points is defined as $D=\{d_1, d_2, \ldots d_{L-1}\}$, where $d_i=I_{i+1}-I_i$ (i.e. the distance between the frequency bins). A frequency bin represents the resolution of the digitized frequency information. For example, if a band between 1 MHz-11 MHz is being monitored using a 1 MHz frequency resolution, then there would be 10 frequency bins (i.e., the first covering 1-2 MHz, the second covering 2-3 MHz, etc). On the other hand, if the frequency resolution were 1 Hz, there would be 10 million frequency bins.

A cluster contains frequency bin indices in $f_{bin}$ corresponding to zeros in addition to the anchor point indices in I. More particularly, a cluster is defined as a sequence of anchor points, $\{I_i, I_{i+1}, \ldots I_{i+V}\} \subset I$, whose distances satisfy $\{d_i \leq \epsilon, d_{i+1} \leq \epsilon, \ldots d_j \leq \epsilon\}$, where is the maximum distance needed to form a cluster, and V<L. A cluster of size $(I_{i+V}-I_i)$ is then defined as $$I_C=\{I_i, I_i+1, \ldots, J_i+1, \ldots, J_{i+V}-1, J_{i+V}\}. \qquad (2)$$

Next, in step 130, clusters and isolated anchor points are eliminated from the input RF signal. A cluster contains frequency bin indices in $f_{bin}$ corresponding to zeros in addition to the anchor point indices in I. All clusters, and isolated anchor points, are then eliminated from $f_{bin}$. These represent high energy regions of interference. The advantage of this technique is that multiple frequency bins (including the zeros not included in I) are eliminated based only on the analysis of anchor point distances; not on the analysis of the power estimates that would require additional processing. This results in a low computationally complex process of order O(L).

In some embodiments, it may be is possible to simply eliminate these frequency bins and end the method after step 130. This may be suitable for some applications. However, for many applications, power leakage from nearby clusters and anchor points which are eliminated from the processing may present a problem. Thus, it is preferred that a quality or risk assessment be performed for most embodiments.

In step 140, a quality or risk assessment of remaining frequencies in the input RF signal is conducted, and high risk frequencies are eliminated. Risk can be assessed in a variety of ways. For example, a risk analysis may be executed with output ranging from 0 to 1, with a value of 1 corresponding to 100% risk and a value of 0 corresponding to 0% risk. High risk and low risk may be defined for a given application. The exact risk function is application dependent, but should be chosen such that its computational complexity does not exceed O(N). Thus, the overall computational complexity for the entire fast spectrum sensing method 100 becomes O(N).

Figure 2A:
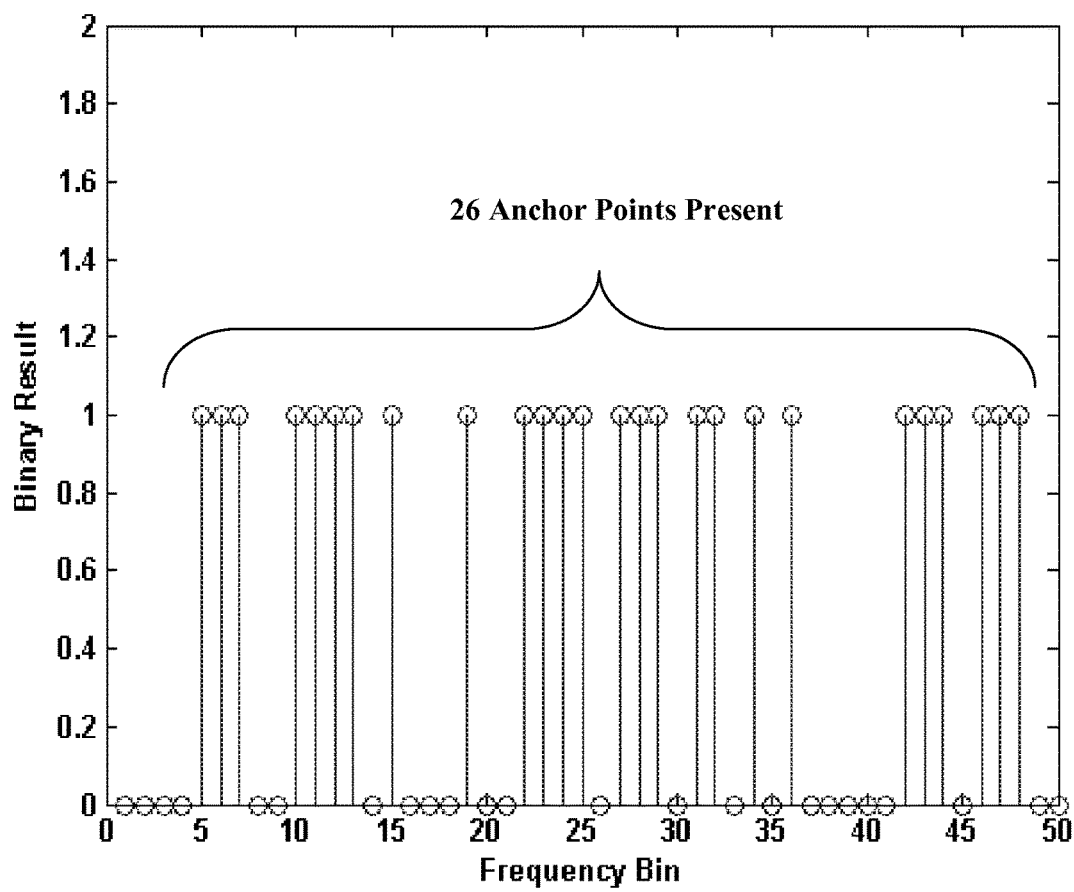
FIGS. 2A-C shows exemplary execution of, and results of a fast spectrum sensing method according to an embodiment.
Figure 2B:
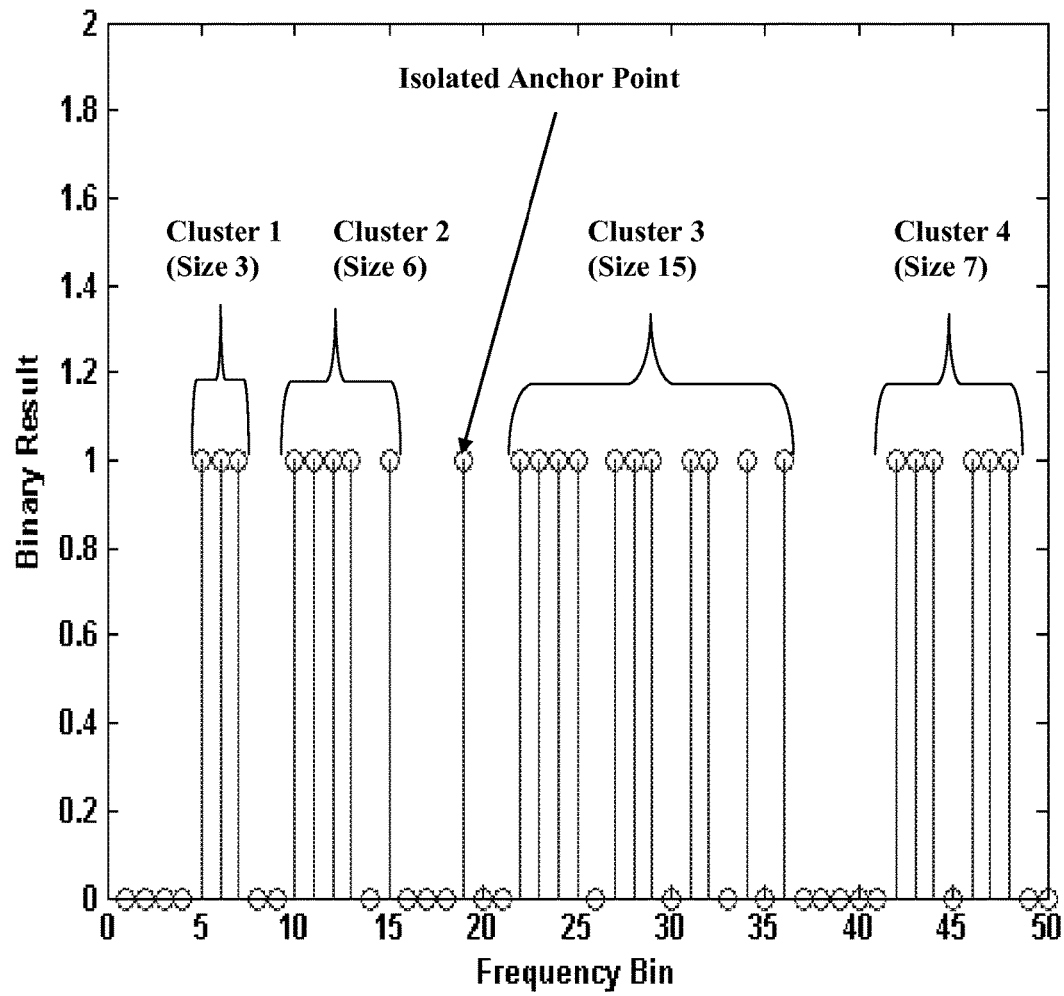
Figure 2C:
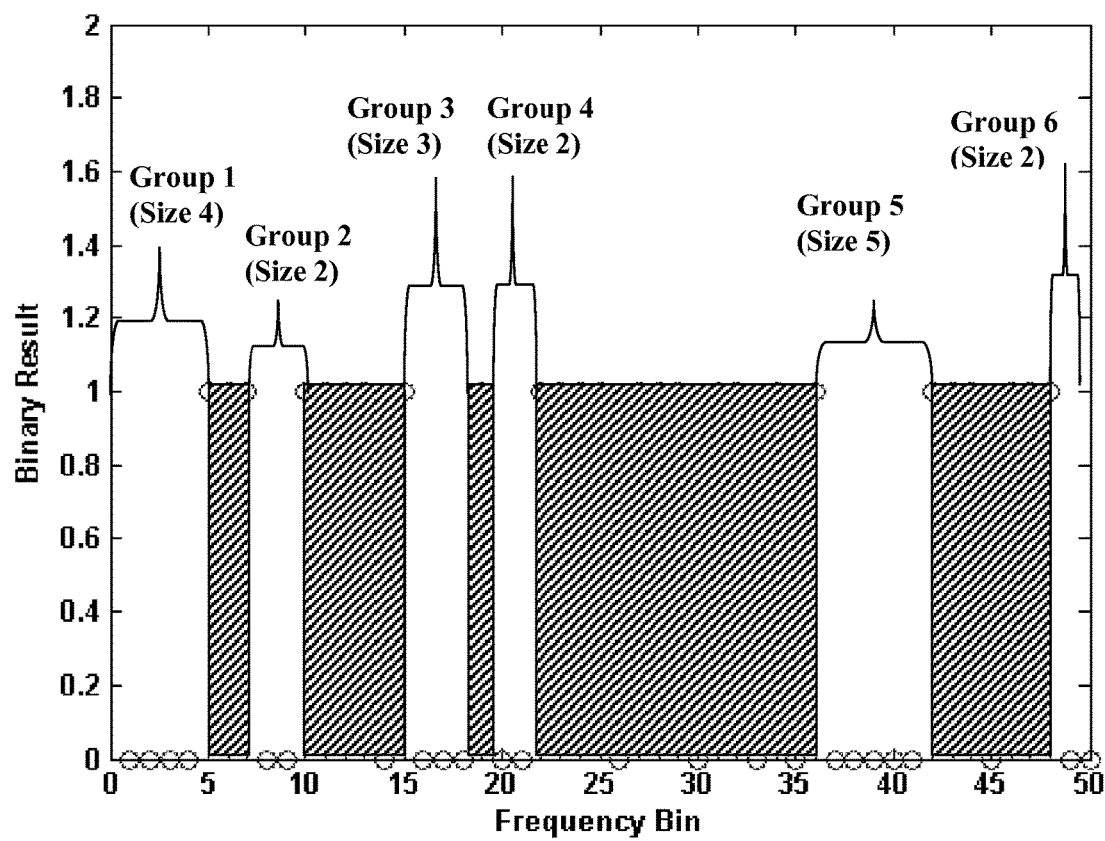

FIGS. 2A-C show exemplary execution of, and results of a fast spectrum method according to an embodiment. The data for the illustration of FIG. 2A was created using the MATLAB syntax rand(1,50)>0.5. The rand function in MATLAB generates an array of uniformly distributed pseudorandom numbers. By using the ">0.5" condition in the innovative method, MATLAB rounds the numbers above 0.5 to 1 and below 0.5 to 0. Thus, the function call provides an array of 50 binary values, thereby simulating values that could occur at the output of the binary hypothesis test. The data and results illustrated here are for exemplary purposes and to better illustrate the method; they are not limiting on the scope of the invention. FIG. 2A is a plot of the binary results after (1) is implemented for N=50; the value "one" corresponds to $x_j>\gamma$, and the value "zero" corresponds to $x_j<\gamma$. The indices, i.e. the frequency bins, satisfying the alternate hypothesis (the ones) are then selected for further processing. Here, the indices are defined as a $I=\{I_1, \ldots I_L\} \subset f_{bin}$, where $f_{bin}=\{1, \ldots N\}$ and L≤N, and the set I corresponds to anchor points that represent high power locations within the power spectrum. FIG. 2A shows twenty-six anchor points have been determined from the data.

FIG. 2B shows example clusters for the anchors points shown in FIG. 2A for s=2. Given that there are 50 exemplary points generated, the distance of 2 was chosen here to better illustrate how clusters are formed using the data; although, other values could certainly be selected as suitable for an intended application. As can be seen, four clusters (of sizes 3, 6, 15 and 7, respectively) and one isolated anchor point have been identified.

As illustrated in FIG. 2C, the remaining frequency bins in $f_{bin}$ form natural groups within the input RF signal. Here, six groups G created by the deleted indices remain of sizes 4, 2, 3, 2, 5 and 2, respectively. The set of W groups is defined as $G=\{G_1, \ldots G_W\}$, where each group G is separated by the "gap" created by the deleted indices. The group $G_i=\{g_{i,1}, \ldots g_{i,Z(i)}\} \subset G$ is defined as a set of Z(i) sequential indices. The example in FIG. 2C indicates that $G=\{G_1, \ldots G_6\}$, $Z(1)=4$, $G_1=\{g_{1,1}=1, g_{1,2}=2, g_{1,3}=3, g_{1,4}=4\}$, etc. These values correspond to the number of bins in the group.

The risk of each group G is next assessed, and high risk frequencies are eliminated. The step is performed since it is possible that power from the anchor points can leak into frequency bin (within a group) over time. That is to say, a leak occurs when power from a neighboring frequency bin appears at a later time in that frequency fin, but is not present at the current time.

FIGS. 3A-3D show examples of quality or risk assessment methodologies which may be implemented in step 140 of method 100 according to embodiments. More than one or these methodologies may be combined for some applications.

Figure 3A:
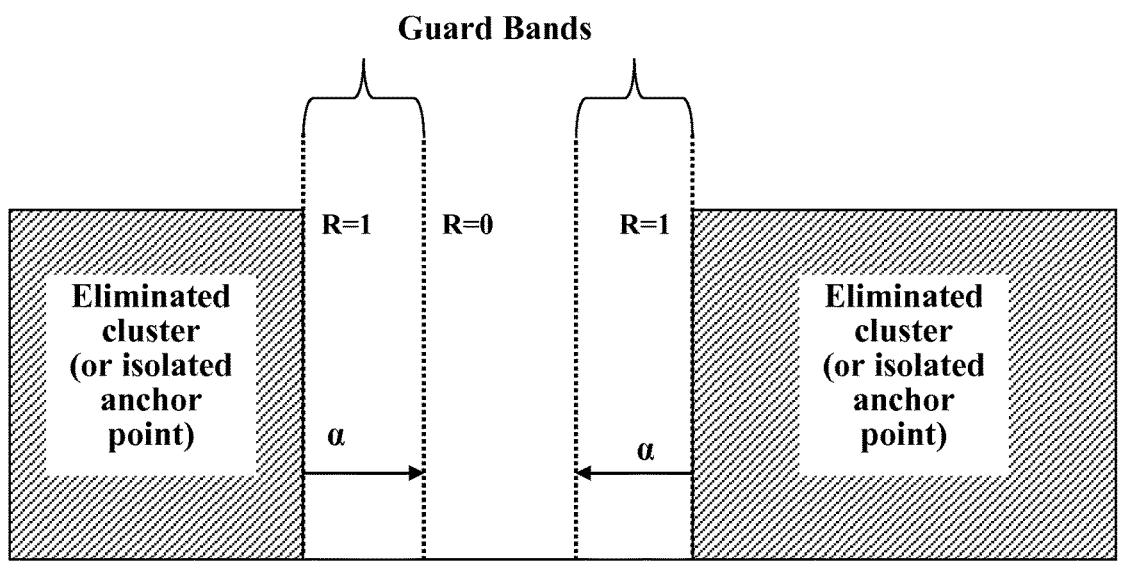
FIGS. 3A-3D show examples of quality or risk assessment methodologies according to embodiments.

FIG. 3A shows a risk function based on a fixed function that may be used. In this example, the risk function defines one or more guard bands from the edges/boundaries of adjacent eliminated clusters or isolated anchor points. It is assumed that within these guard bands, some sidelobe power from the unwanted frequencies is presented and that the risk is high. Here, the guard bands are of width a are drawn from the edges/boundaries of adjacent eliminated clusters or isolated anchor points. The width a may correspond to any number of frequencies bins or bands which are sufficient to provide a buffer for known sidelode interference. The frequencies inside these sidelobe regions are assigned a risk of 1 (R=1) and eliminated, whereas frequencies in the group safely away from the guard bands are assigned a risk of 1 (R=0).

Figure 3B:
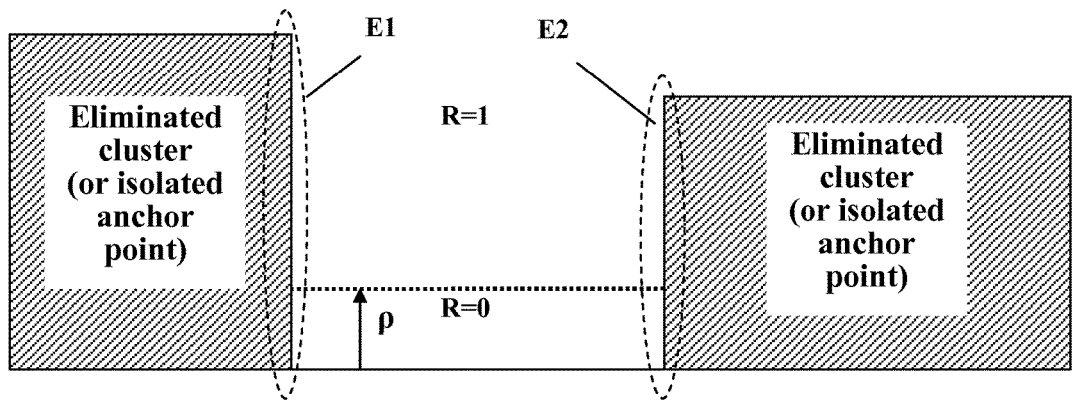

FIG. 3B shows another risk function that may be used. In this example, power levels at the edge of clusters or isolated anchor points are checked against a noise threshold. The power levels of all unoccupied frequencies in the group could be assessed, but they have already been assessed by in step 110, for instance, by the binary hypothesis test. A better way would be to access the interference values on the edges of the cluster or isolated anchor point; this will show "how bad" the interference is next to the unoccupied frequencies in the group. It may be assumed that if a wideband interference source's power level is below a noise threshold ρ that it would not be detected by this threshold test and thus represents low risk. The edges E1 and E2 can be analyzed this way. As shown, if the power level at (or near) the edge of the cluster or isolated anchor points is below the noise threshold ρ, then it is assigned a risk of 0 (R=0). And, if the power level there is above the noise threshold ρ, then it is assigned a risk of 1 (R=1) and will be eliminated.

Figure 3C:
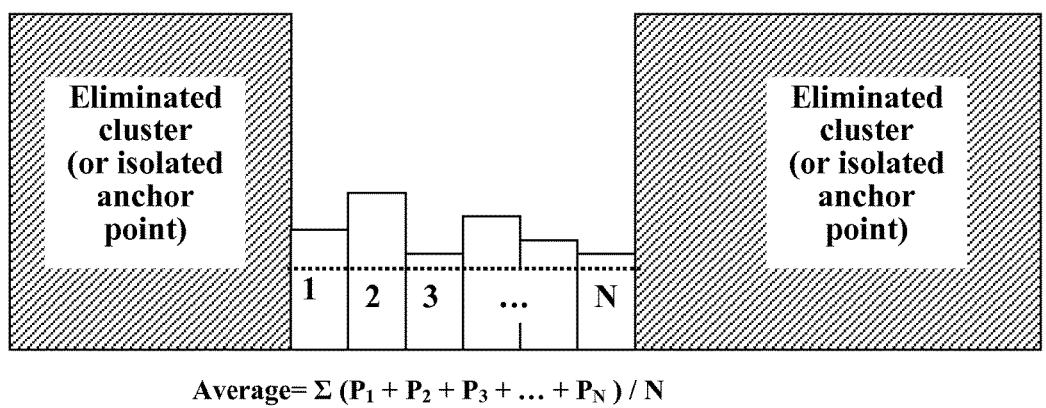

FIG. 3C shows a further risk function that may be used. In this example, the average power of the group is determined to see if it exceeds the noise threshold ρ. The average power is determined by summing the power at each frequency bin and dividing the sum by the number of frequency bins. This technique may be effective for determining noise and interference not detectable by the simple threshold test of FIG. 3B. If the average power is less than the threshold ρ, then it is assigned a risk of 0 (R=0); else it is assigned a risk of 1 (R=1) and will be eliminated. Taking this technique further, in other implementations, the average power of each group may be determined in this manner and the group with the lowest average power selected as minimal risk.

Figure 3D:
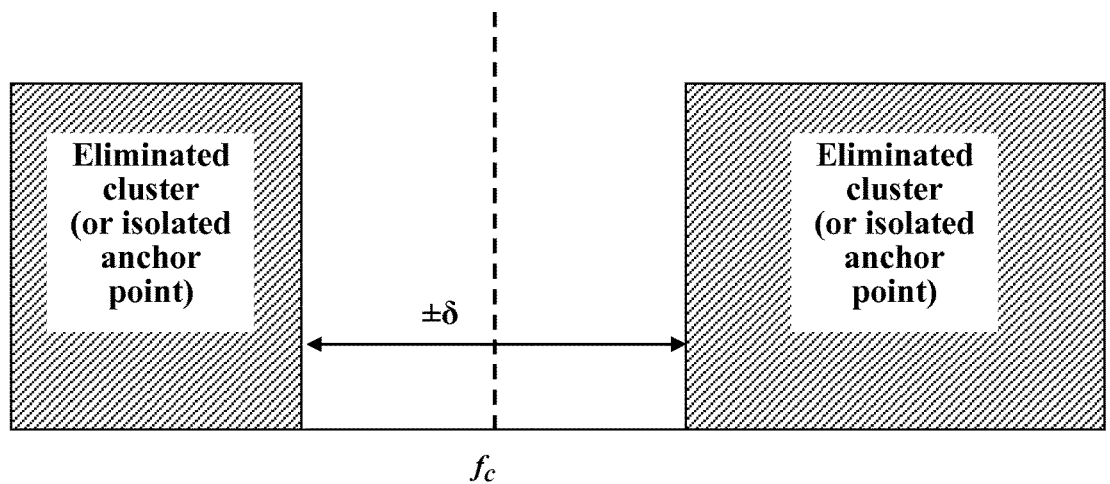

FIG. 3D shows yet another risk technique that may be used. In this example, the goal is to determine a single frequency among the groups which has the largest bandwidth. As shown, the center frequency $f_c$ is selected for the group and then the largest bandwidth is determined for the center frequency $f_c$. The bandwidth ±δ can be measured from the center frequency $f_c$ to the edges/boundaries of adjacent eliminated clusters (or isolated anchor points) or alternatively to any guard bands as discussed above.

The bandwidth δ may be compared with a bandwidth threshold λ, to see if it is sufficient for an application. If is it greater than the bandwidth threshold λ, it is assigned a risk of 0 (R=0); if it is less, it is assigned a risk of 1 (R=1) and will be eliminated. Taking this technique further, the bandwidths for group may be determined in this manner, and the group having the largest determined bandwidth δ may be selected as minimal risk.

FIG. 4 is a block diagram of a fast spectrum sensing system 400 according to an embodiment. The system can be used by any RF system implementing an energy detection method for spectrum sensing for various military and commercial activities. RF systems for military use can include: 1) Cognitive Radar for Missile Tracking, 2) Cognitive Radar to detect concealed weapons, unexploded ordinance (UXO), electronics, and other man-made objects, and 3) Cognitive Radio for military communications; RF systems for commercial use can include: 1) Cognitive nonlinear radar for automobile accidence avoidance, 2) Cognitive nonlinear radar for junction range finder for eavesdropping/"bug" detection, 3) Cognitive nonlinear radar for electronic device detection for FCC Part-15 compliance, 4) Cognitive nonlinear for insect tracking, for example. The technology is also well-suited to narrow-band applications, such as cellular telephone networks.

The system 400 includes 410—a Front-End module, 420—an analog digital converter (ADC), 430—a discrete Fourier transform (DFT) module, 440—an Estimate Power module, and 450—a Fast Spectrum Sensing module. An RF signal is received by one or more antennas 405 (one of which is illustrated in the figure).

The received signal is processed by the analog front-end module 410 with center frequency $f_c$, bandwidth B. Next, the processed signal from the front-end module 410 is digitized using the ADC module 420 with sampling frequency $F_s$, and dynamic range $P_{dr}$ to generate a resulting set of N real, time-domain samples as $y=\{y_1, \ldots y_N\}$. The choice of the front-end module 410 may be dependent on the type of ADC module 420 used (although both are common hardware components and many choices exist).

The digitized signal is then transformed to the frequency domain in the DFT module 430 implementing a discrete Fourier transform function. This results in a set of frequency domain samples in the fundamental band, defined as $\eta = \{\eta_1, \ldots \eta_N\}$ which correspond to the frequencies $f = \{f_1, \ldots f_N\}$. The frequency resolution is defined as $F_r = F_s/N$, where $F_s$ is the sampling frequency.

Next, the power of the signal at various frequencies $f_k$ is estimated in the Estimate Power module 440 as $x_k = \eta_k|^2$, where $f_k \in f$. In some implementations, module 440 may be implemented in an FPGA or implemented in the CPU. These power estimates are processed by the innovative Fast Spectrum Sensing module 450 which implements the fast spectrum sensing method 100.

The module 450 may be a computer having one or more processors (or micro-processors) as known in the art that are configured to execute the method 100. Processor-executable instructions can be stored in a memory device and execute by the processors when needed. In some implementations, software code (instructions), firmware, or the like, may be stored on a computer or machine-readable storage media having computer or machine-executable instructions executable by the processor(s). The processor(s) may be a programmable processor, such as, for example, a field-programmable gate array (FGPA) or an application-specific integrated circuit (ASIC) processor. The methodology disclosed herein may be implemented and executed by an application may be created using any number of programming languages, such as MATLAB as set forth in Appendix A of the aforementioned '187 provisional patent application. Of course, any number of hardware implementations, programming languages, and operating platforms may be used without departing from the spirit or scope of the invention. As such, the description or recitation of any specific hardware implementation, programming language, and operating platform herein is exemplary only and should not be viewed as limiting.

Comparison with a Conventional Spectrum Sensing Method

FIG. 5 is a block diagram of a conventional method 500 for detecting an unused frequency for comparison sake. This conventional method was originally introduced by A. Martone, K. Ranney, A. Hedden, G. Mazzaro, D. McNamara, in the paper titled "Cognitive processing for nonlinear radar," in *Proceedings of SPIE Radar Sensor Technology XVII*, Vol. 8714, Baltimore, Md., May 2013, to determine potential transmit and receive frequencies for nonlinear radar. It employs a minimization technique that examines the cumulative power at individual and neighboring frequencies to determine idle (i.e. unused) channels. In general, this conventional method uses a window function to measure the surrounding power of selected unused frequencies. Although this method accurately selects unused frequencies with minimum neighboring power, it relies on a brute force approach and has high computational complexity.

The conventional method first requires that: 1) the sampled time-domain data is converted to the frequency domain via the fast Fourier transform (FFT); 2) power estimates are determined for the frequency domain samples. This processing produces the power samples $X = \{x_1, \ldots x_N\}$ corresponding to the frequencies $f = \{f_1, \ldots f_N\}$. In its own processing, the conventional method first processes the power samples in X by a single-frequency power detector in step 510. This detector selects frequencies satisfying the null hypothesis; more particularly, the frequencies satisfying the null hypothesis, $x_i < \gamma_1$, are selected for further processing. These samples are defined as $Y=\{y_1, \ldots y_k\}$ corresponding to the frequencies $\hat{f}=\{\hat{f}_1, \ldots \hat{f}_k\}$. $K \leq N$ is the total number frequencies below $\gamma_1$ i.e. the frequencies devoid of noise satisfying criterion 1. It is noted that the relationship $x_{\lambda(i)} = y_i$, where $\lambda(i) \in \{1, \ldots N\}$ is the index function used to map the $i^{th}$ sample in Y to that in X. The computational complexity of the single-frequency power detector is of order $O(N)$ since each sample in X is examined.

The surrounding power of the samples in Y is next processed by the adjacent-frequency energy (AFE) detector in step 520. The AFE detector is defined by:

$$\rho[y_i] = \sum_{l=-M/2}^{M/2} \alpha(l) x_{\lambda(i)+l} \overset{H_1}{\underset{H_0}{\gtrless}} \gamma_2, \quad (3)$$

where $\alpha(\ )$ is a discrete window function with a center at $l=0$, $M+1$ is the window size, and M is even. $\gamma_2$ is defined as the threshold variable for the AFE detector. The samples satisfying the null hypothesis, $y_i < \gamma_2$, of the AFE detector are defined as $Z=\{z_1, \ldots z_P\}$ corresponding to frequencies $\tilde{f}=\{\tilde{f}_1, \ldots \tilde{f}_P\}$. $P \leq K$ is the total number frequencies below $\gamma_2$, i.e. the frequencies whose surrounding power is minimal thereby satisfying criterion 2. The computational complexity of the AFE detector is of order $O(2MK)$: since the window function is applied to each sample in Y and requires both multiplication and addition.

One key advantage of the innovative fast spectrum sensing methodology described herein, as compared to this conventional method, is its extremely low computational complexity. For example, consider the spectrum sensing experiment conducted in aforementioned reference which discussed using the conventional method to process spectral information observed in the electromagnetic environment (EME). The spectral information was recorded by an Agilent Technologies N9342CN spectrum analyzer using a SAS-230-20 omni-directional antenna. The input parameters to the spectrum analyzer were: resolution bandwidth of 1kHz, reference level of −40 dBm, attenuation value of 10 dB, and averaging of 5. The frequency range is chosen arbitrarily from 400 MHz to 500 MHz. The SAS-230-20 antenna was vertically polarized with a bandwidth from 20 to 1000 MHz. The gain of the antenna is −5 to +3 dBi. The processing used N=100001, M=1000, and a Hanning window function for $\alpha(\ )$. The Hanning window function was used to emphasize the power close to the sample under evaluation. $\gamma_2$ is chosen as 1 dB above an estimate of the noise floor after the noise floor is processed by (3).

The results for the conventional method processing indicated K=86902 samples satisfying the null hypothesis used by the single-frequency energy detector. The processing of the adjacent-frequency energy detector indicates P=52424 samples satisfying the null hypothesis (i.e. 52424 frequencies are unused). The number of operations used by the conventional method is $(2MP) = 174 \times 10^6$.

For comparison sake, the same data from this previous experiment was used to evaluate the innovative fast spectrum sensing methodology according to one embodiment (which utilizes the Matlab code in Appendix A of the aforementioned '187 provisional patent application) with $\gamma_3 = -114$ dBm (equal to $\gamma_1$) and $\epsilon=501$. $\epsilon$ is chosen to match the conventional processing using a Hanning window of size 1001, where $\epsilon \approx M/2$ due to the tapering of the window function. If the rectangular window function were used, then $\epsilon \approx M$. The processing for this method assumes zero risk tolerance, i.e. any frequency associated with $\gamma_i > 0$ was disregarded. The result for the innovative fast spectrum sensing method indicates 52536 unused frequencies, a result similar to that of conventional method. But the number of operations used by the innovative method is $O(N)=100,000$, a quantity of well over 1000 times less than that of the conventional method.

Related aspects have been previously disclosed by inventors including the paper by Anthony F. Martone and Kenneth Ranney titled "Fast Technique for Wideband Spectrum Sensing," presented at the 2014 IEEE International Symposium on Antennas and Propagation and USNC-URSI Radio Science Meeting in Memphis, Tenn., Jul. 6-11, 2014 and the paper and presentation by Anthony Martone et al. titled "Spectrum Sensing Techniques for Nonlinear Radar" presented at the SPIE 2014 Conference in Baltimore, Md., May 5-9, 2014, which are hereby incorporated by reference in their entireties.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, modules and circuits are described above in associated with their respective functions. These elements, devices, modules and circuits are considered means for performing their respective functions as described herein.

While the foregoing is directed to embodiments of the present invention, other and further embodiments of the invention may be devised without departing from the basic scope thereof, and the scope thereof is determined by the claims that follow. All references cited above are hereby incorporated by reference herein for all purposes.

We claim:

1. A method for analyzing a received RF signal to determine unused channels, or frequencies, therein, the method comprising:
    analyzing a RF signal received by an antenna to determine anchor points that represent high energy frequency locations;
    calculating distances in terms of frequency between the determined adjacent anchor points;
    identifying and eliminating clusters of anchor points in which the calculated distances indicate an adjacent high energy region of interference and any isolated anchor point; and
    selecting at least one remaining unoccupied frequency for transmitting or receiving a RF signal,
    wherein the at least one remaining unoccupied frequency available for selection is unknown before the received RF signal is analyzed.

2. The method of claim 1, wherein (i) any unused determined frequency is substantially devoid of noise; and (ii) the surrounding energy of the unused determined frequency is minimal.

3. The method of claim 1, wherein prior to determining anchor points, (i) time-domain data of the received RF signal is converted to the frequency domain via the fast Fourier transform (FFT); and (ii) energy estimates are determined for the frequency domain samples.

4. The method of claim 1, wherein the anchor points are determined using a binary hypothesis test.

5. The method of claim 4, wherein the binary hypothesis test is defined as follows:

$$x_i \underset{H_0}{\overset{H_1}{\gtrless}} \gamma$$

where $x_i$ is the $i^{th}$ energy sample, $\gamma$ is the threshold variable, $H_0$ is the null hypothesis for $x_i = n_i$ (noise only), $H_1$ is the alternative hypothesis for $x_i = s_i + n_i$ (signal plus noise), $s_i$ is the deterministic signal to be detected, and $n_i$ is additive white Gaussian noise; the anchor points are selected using the alternate hypothesis in (1), $x_i > \gamma$; and the anchor points are denoted $I = \{I_1, \ldots I_L\}$ where $L \leq N$, and the set I corresponds to anchor points that represent high power locations within the power spectrum.

6. The method of claim 4, wherein distances between the anchor points are calculated as $d_i = I_{i+1} - I_i$ forming the set $D = \{d_1, d_2, \ldots d_{L-1}\}$.

7. The method of claim 6, wherein, a cluster is defined as a sequence of anchor points, $\{I_i, I_{i+1}, \ldots I_{i+V}\} \subset I$, whose distances satisfy $\{d_i \leq \epsilon, d_{i+1} \leq \epsilon, \ldots d_j \leq \epsilon\}$, where $\epsilon$ is the maximum distance needed to form a cluster, and $V < L$.

8. The method of claim 7, wherein eliminating the clusters comprises removing the clusters thereby forming the set of groups $G = \{G_1, \ldots, G_W\}$, where each group is separated by a gap created by the deleted indices, and the group $G_i = \{g_{i,1}, \ldots g_{i,Z(i)}\} \subset G$ is defined as a set of $Z(i)$ sequential indices.

9. The method of claim 1, further comprising: performing a risk assessment on remaining frequencies of the input RF signal and eliminating high risk frequencies from consideration.

10. The method of claim 9, wherein risk is assessed by techniques selected from the group consisting:
defining a guard band to provide a buffer for anticipated sidelode interference from the edge of an adjacent eliminated cluster or isolated anchor points sufficient, and then determining if power levels in the guard band are above or below a threshold;
determining if power levels at or near the edge of an adjacent eliminated cluster or isolated anchor point is above or below a threshold;
determining if the average power level for unoccupied frequencies is above or below a threshold; and
determining if the bandwidth between adjacent eliminated clusters or isolated anchor points is above or below a threshold.

11. The method of claim 10, further comprising selecting a remaining frequency having a minimal risk assessment.

12. The method of claim 1, wherein the overall computational complexity of the entire method is of the order of magnitude of the number of frequencies of the received RF signal which were considered.

13. A system for analyzing a received RF signal to determine unused channels, or frequencies, therein, the system having at least one processor and one or more modules executable by the at least one processor, and comprising:
a fast spectrum sensing module configured to execute the method of claim 1.

14. The system of claim 13, further comprising:
an antenna which receives an RF signal;
a front-end module configured to process the received RF signal;
an analog digital converter (ADC) configured to digitize the processed signal;
a discrete Fourier transform (DFT) module configured to transform the digitized signal into a set of frequency domain samples; and
an estimate power module configured to estimate the power of the signal at various frequencies.

15. The system of claim 13, wherein power samples $X = \{x_1, \ldots x_N\}$ corresponding to frequencies $f = \{f_1, \ldots f_N\}$ are inputs to the fast spectrum sensing module.

16. The system of claim 14, wherein the received signal is processed by the front-end module with a center frequency $f_c$, having a bandwidth B.

17. The system of claim 14, wherein the processed signal from the front end module is digitized using the ADC with a sampling frequency $F_s$ and a dynamic range $P_{dr}$ to generate a resulting set of N real, time-domain samples as $y = \{y_1, \ldots y_N\}$.

18. The system of claim 14, wherein the digitized signal from the ADC is transformed to the frequency domain in the DFT module implementing a discrete Fourier transform function which results in a set of frequency domain samples in the fundamental band, defined as $\eta = \{\eta_1, \ldots \eta_N\}$ which correspond to the frequencies $f = \{f_1, \ldots f_N\}$.

19. The system of claim 14, wherein the power of the signal at various frequencies $f_k$ is estimated in the estimate power module as $x_k = |\eta_k|^2$, where $f_k \epsilon f$, in which f is a frequency, $\eta$ is a fundamental band, and k is a particular frequency value or frequency bin of interest.

20. A non-transitory computer-readable storage medium having computer-readable instructions, that when executed by a processor, implement the method for analyzing a received RF signal to determine unused channels, or frequencies, of claim 1.

* * * * *